United States Patent
Minn et al.

(10) Patent No.: US 9,080,714 B2
(45) Date of Patent: Jul. 14, 2015

(54) ADJUSTABLE PORTABLE DEVICE HOLDER

(71) Applicant: Kenu Inc., San Francisco, CA (US)

(72) Inventors: Kenneth Y. Minn, San Francisco, CA (US); David E. Yao, San Francisco, CA (US)

(73) Assignee: Kenu, Inc., San Francisco, CA (US)

( * ) Notice: Subject to any disclaimer, the term of this patent is extended or adjusted under 35 U.S.C. 154(b) by 0 days.

(21) Appl. No.: 13/897,062

(22) Filed: May 17, 2013

(65) Prior Publication Data

US 2014/0138419 A1 May 22, 2014

Related U.S. Application Data

(63) Continuation-in-part of application No. 29/437,793, filed on Nov. 20, 2012, now Pat. No. Des. 690,707.

(51) Int. Cl.
*B60R 7/06* (2006.01)
*B60R 11/02* (2006.01)
*F16M 13/02* (2006.01)
*F16M 11/04* (2006.01)
*F16M 11/10* (2006.01)
*F16M 13/00* (2006.01)
*B60R 11/00* (2006.01)

(52) U.S. Cl.
CPC ........... *F16M 13/022* (2013.01); *F16M 11/041* (2013.01); *F16M 11/105* (2013.01); *F16M 13/00* (2013.01); *B60R 11/0241* (2013.01); *B60R 11/0258* (2013.01); *B60R 2011/0008* (2013.01); *B60R 2011/0294* (2013.01); *Y10S 224/929* (2013.01); *Y10T 29/49826* (2015.01)

(58) Field of Classification Search
CPC .............. B60R 7/06; B60R 2011/0005; B60R 2011/0008; B60R 11/0241; B60R 11/0258; B60R 2011/0294; Y10S 224/929
USPC .................. 224/483, 556, 275, 929, 544, 276
See application file for complete search history.

(56) References Cited

U.S. PATENT DOCUMENTS

| 5,109,411 | A | * | 4/1992 | O'Connell | 379/454 |
| 5,305,381 | A | † | 4/1994 | Wang | |
| 5,338,252 | A | * | 8/1994 | Bowler et al. | 454/155 |
| 5,979,724 | A | * | 11/1999 | Loewenthal et al. | 224/483 |
| 6,103,201 | A | * | 8/2000 | Green | 422/124 |

(Continued)

FOREIGN PATENT DOCUMENTS

| KR | 10-2000-0044438 | | 7/2000 |
| KR | 20-0429528 | | 10/2006 |
| WO | 9604153 | † | 2/1996 |

OTHER PUBLICATIONS

The International Search Report and the Written Opinion mailed Oct. 10, 2014; in PCT patent application No. PCT/US2014/038253, 12 pages.

(Continued)

*Primary Examiner* — Justin Larson
*Assistant Examiner* — Scott McNurlen
(74) *Attorney, Agent, or Firm* — Troutman Sanders, LLP

(57) ABSTRACT

Adjustable portable device holder systems and methods are herein disclosed. According to one embodiment, an adjustable portable device holder includes an adjustable clamping element and a rotatable mounting element attached to the adjustable clamping element for removably securing a portable device to the adjustable portable device holder.

14 Claims, 5 Drawing Sheets

(56) References Cited

U.S. PATENT DOCUMENTS

| | | | |
|---|---|---|---|
| 6,366,672 B1 | 4/2002 | Tsay | |
| 6,441,872 B1 * | 8/2002 | Ho | 348/837 |
| D482,039 S | 11/2003 | Chen et al. | |
| 6,988,907 B2 | 1/2006 | Chang | |
| 7,061,386 B2 † | 6/2006 | Seresini | |
| 7,080,812 B2 * | 7/2006 | Wadsworth et al. | 248/316.6 |
| 7,140,553 B2 * | 11/2006 | Zobele | 239/34 |
| D538,912 S † | 3/2007 | Kaplan | |
| 7,272,984 B2 | 9/2007 | Fan | |
| 7,284,737 B2 * | 10/2007 | Kane | 248/311.2 |
| D589,962 S | 4/2009 | Maruyama et al. | |
| D611,478 S | 3/2010 | Richardson et al. | |
| D630,222 S | 1/2011 | Lin | |
| D645,033 S * | 9/2011 | Quong et al. | D14/253 |
| D656,931 S | 4/2012 | Wikel | |
| D656,940 S | 4/2012 | McClelland et al. | |
| D657,356 S | 4/2012 | Wikel | |
| D663,726 S | 7/2012 | Gourley | |
| D663,735 S | 7/2012 | Musselman | |
| D664,147 S | 7/2012 | Zhao et al. | |
| D671,950 S | 12/2012 | Richter | |
| 8,727,192 B2 * | 5/2014 | Lai | 224/420 |
| 8,757,461 B2 * | 6/2014 | Zanetti | 224/562 |
| 2005/0127538 A1 † | 6/2005 | Fabrega | |
| 2007/0284500 A1 * | 12/2007 | Fan | 248/346.06 |
| 2008/0190978 A1 * | 8/2008 | Brassard | 224/483 |
| 2008/0224007 A1 † | 9/2008 | Mo | |
| 2009/0060473 A1 * | 3/2009 | Kohte et al. | 386/124 |
| 2010/0019059 A1 * | 1/2010 | Bulsink et al. | 239/55 |
| 2011/0019992 A1 | 1/2011 | Orf | |
| 2011/0278885 A1 * | 11/2011 | Procter et al. | 297/135 |
| 2013/0037590 A1 † | 2/2013 | Yoon | |
| 2014/0097306 A1 * | 4/2014 | Hale et al. | 248/122.1 |
| 2014/0103087 A1 † | 4/2014 | Fan | |

OTHER PUBLICATIONS

Arkon Resources Inc., SM429-SBH Universal Air Vent Swivel Mount with Adjustable Cradle, 2010.†

\* cited by examiner
† cited by third party

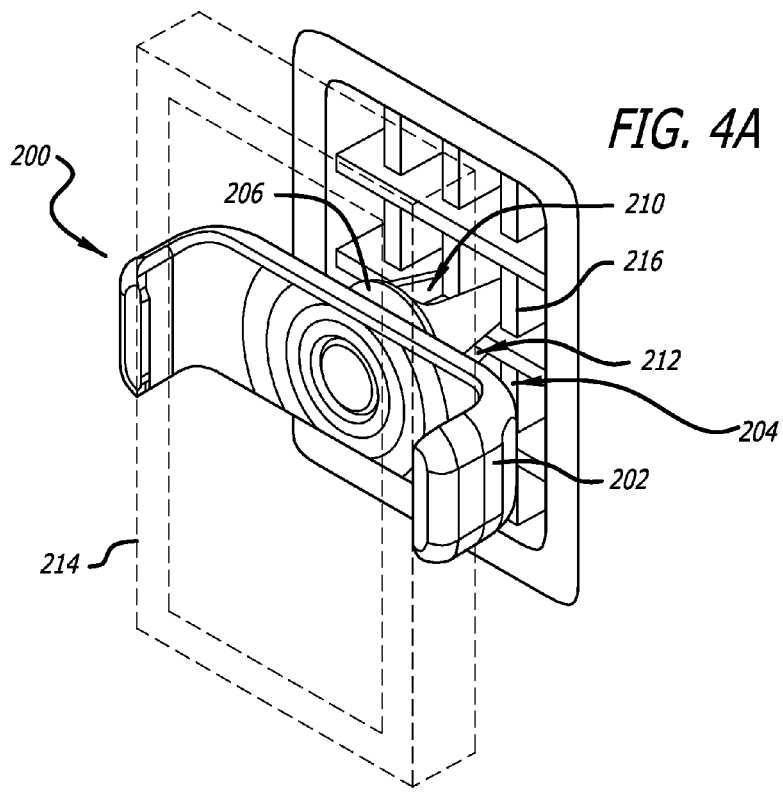
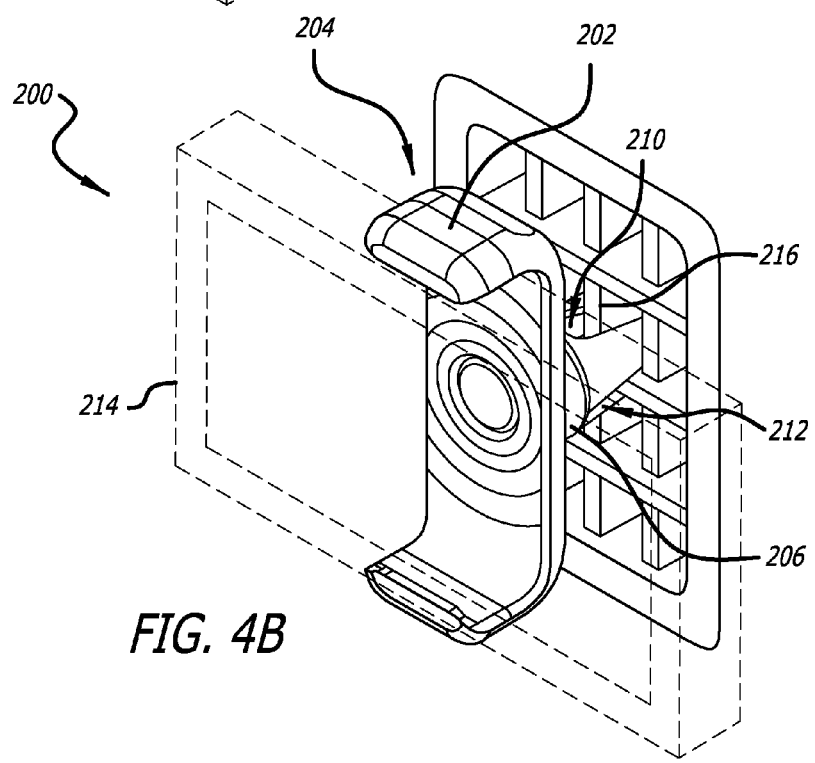

ADJUSTABLE PORTABLE DEVICE HOLDER

CROSS REFERENCE TO RELATED APPLICATIONS

This application is a continuation-in-part (CIP) of U.S. Design patent application No. 29/437,793, filed Nov. 20, 2012 and titled DASHBOARD VENT MOUNT FOR AN ELECTRONIC DEVICE, which is incorporated by reference in its entirety, for all purposes, herein.

FIELD OF TECHNOLOGY

The present application is directed to adjustable portable device holder systems and methods.

BACKGROUND

Various electronic and other device mounts are known in the art. Available device mounts have many drawbacks. For instance, suction cup mounts are typically large, bulky and require a large mounting surface such as a windshield. Device mounts often fail to properly and consistently attach to the mounting surface. Some device mounting solutions require adhesive to secure the mount to a vehicle dash, wearing off over time and leaving an undesirable residue on the mounting surface. Current device mounts also fail to effectively accommodate a broad range of devices or mounting surfaces.

Due to the deficiencies in the currently available device mounts, people choose not use electronic device mounts and often violate state and provincial hands-free driving laws. Other state and provincial laws prohibit objects mounted to the windshield to prevent obstruction of the driver's view.

This specification is directed to improved portable device holder systems and methods for manufacturing the same.

SUMMARY

Adjustable portable device holder systems and methods for manufacturing the same are herein disclosed. According to one embodiment, an adjustable portable device holder includes an adjustable clamping element and a rotatable mounting element attached to the adjustable clamping element for removably securing a portable device to the adjustable portable device holder. The adjustable clamping element is capable of being biased into an activated state and unbiased into a deactivated state to secure one of a plurality of different size portable devices to the adjustable portable device holder. The rotatable mounting element, attached to the adjustable clamping element, includes a plurality of mounting arms each spaced a specified distance apart from one another and extending at a specified angle from a bottom surface of the rotatable mounting element. Each pair of the plurality of mounting arms forms a mounting slot therein between. The rotatable mounting element is capable of being rotated to position a first mounting slot in a vertical, horizontal or diagonal orientation and a second mounting slot in a vertical, horizontal or diagonal orientation to engage a first mounting surface in a vertical, horizontal or diagonal orientation or a second mounting surface in a vertical, horizontal or diagonal orientation.

In another embodiment, a process for manufacturing an exemplary adjustable portable device holder is disclosed. The process includes providing an adjustable clamping element capable of being biased into an activated state and unbiased into a deactivated state to secure one of a plurality of portable device sizes to the adjustable portable device holder. The process also includes providing a rotatable mounting element comprising a plurality of mounting arms each spaced a specified distance apart from one another and extending at a specified angle from a bottom surface of the rotatable mounting element. Each pair of the plurality of mounting arms form a mounting slot therein between. The rotatable mounting element is capable of being rotated to position a first mounting slot in a vertical, horizontal or diagonal orientation and a second mounting slot in a vertical, horizontal or diagonal orientation to engage a first mounting surface in a vertical, horizontal or diagonal orientation or a second mounting surface in a vertical, horizontal or diagonal orientation. The process also includes attaching the rotatable mounting element to the adjustable clamping element.

The foregoing and other objects, features and advantages of the present disclosure will become more readily apparent from the following detailed description of exemplary embodiments as disclosed herein.

BRIEF DESCRIPTION OF THE DRAWINGS

Embodiments of the present application are described, by way of example only, with reference to the attached Figures, wherein:

FIGS. 4A and 4B illustrate an adjustable portable device holder attached to a device and a mounting surface according to one embodiment;

DETAILED DESCRIPTION

Figure 1:
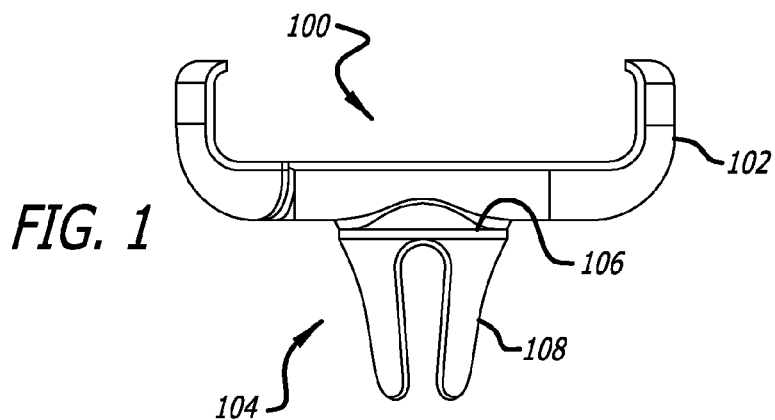
FIG. 1 illustrates an adjustable portable device holder in a retracted setting, also referred to as the deactivated state, according to one embodiment.

It will be appreciated that for simplicity and clarity of illustration, where considered appropriate, reference numerals may be repeated among the figures to indicate corresponding or analogous elements. In addition, numerous specific details are set forth in order to provide a thorough understanding of the example embodiments described herein. However, it will be understood by those of ordinary skill in the art that the example embodiments described herein may be practiced without these specific details. In other instances, methods, procedures and components have not been described in detail so as not to obscure the embodiments described herein.

The adjustable portable device holders described in this specification can include an adjustable clamping element attached to a rotatable mounting element. The adjustable portable device holder can be used to attach and mount a portable device to a mounting surface. The portable device can be any device that fits into the adjustable clamping element including, but not limited to a smartphone or other phone, a tablet, an e-reader, a powerbank, a speaker, a multimedia player, a flashlight or other light, a television or other display, a laser or radar detector, an air freshener, a fan, a beverage or other device that can fit into the adjustable clamping element. The adjustable portable device holder can be mounted to various mounting surfaces including, but not limited to an automobile air conditioner vent blade, an automobile dashboard, an automobile sun visor, a credit card, the brim of a hat, a counter, a tripod, a bicycle, a backpack, a utensil, a ledge or other surface.

FIG. 1 illustrates an adjustable portable device holder 100 in a retracted setting according to one embodiment. The adjustable portable device holder 100 includes an adjustable clamping element 102 attached to a rotatable mounting element 104.

Figure 2:
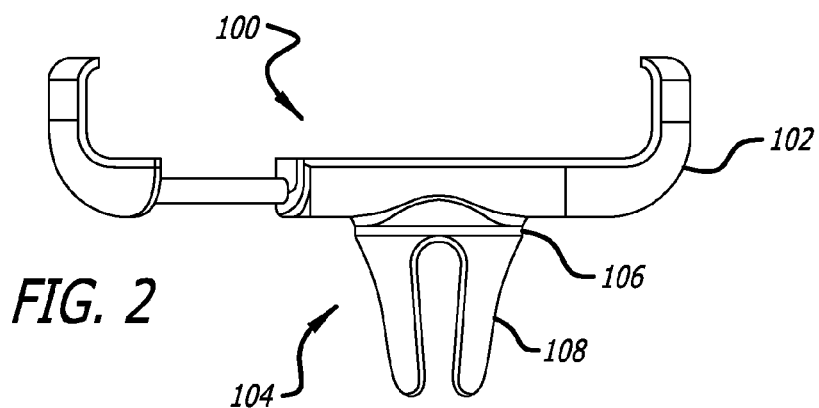
FIG. 2 illustrates an adjustable portable device holder in an expanded setting, referred to as the activated state, according to one embodiment.

FIG. 2 illustrates an adjustable portable device holder 100 in an expanded setting according to one embodiment. The adjustable portable device holder 100 includes an adjustable clamping element 102 attached to a rotatable mounting element 104.

Figure 3:
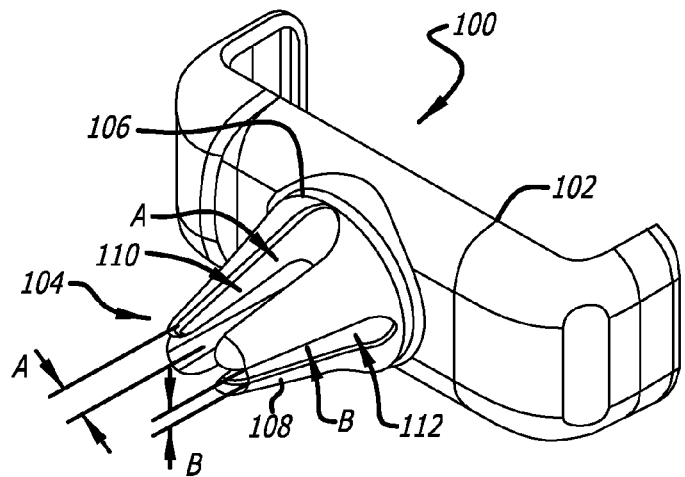
FIG. 3 illustrates an adjustable portable device holder in a retracted setting according to one embodiment.

FIG. 3 illustrates an adjustable portable device holder 100 in a retracted setting according to one embodiment. The adjustable portable device holder 100 includes an adjustable clamping element 102 attached to a rotatable mounting element 104.

The adjustable clamping element 102 illustrated in FIGS. 1-3 can be expanded and retracted to attach devices of different sizes to the adjustable portable device holder 100. A force can be applied to expand or bias the adjustable clamping element 102 into an activated state (shown in FIG. 2) and the force can be released to retract the adjustable clamping element 102 into a deactivated state (shown in FIGS. 1 and 3). An elastic retracting or biasing element (not shown), such as a compression or torsion spring can be incorporated into the adjustable clamping element 102. The compression or torsion spring facilitates the expansion and retraction of the adjustable clamping element 102 upon applying or releasing an expansive force on a surface of the adjustable clamping element 102.

The adjustable clamping element 102 can also include a gripping material on a surface of the adjustable clamping element 102 to provide a better grip, a better viewing angle or better attachment to a device secured within the adjustable clamping element 102. The gripping material can be applied to a portion of the adjustable clamping element 102 or the entire adjustable clamping element 102 can be made of the gripping material. The gripping material can be any material that increases the adhesion, grip or coefficient of friction between the gripping surface of the adjustable clamping element 102 and a surface of a device secured within the adjustable clamping element 102. The gripping material can include, but is not limited to rubber, polymeric material or other plastic, metal, alloy, fabric, composite material or other material capable of increasing the adhesion, grip or coefficient of friction between the gripping surface of the adjustable clamping element 102 and a surface of a device secured within the adjustable clamping element 102. The gripping material and gripping surface can be textured and composed of the same or different material.

The rotatable mounting element 104 illustrated in FIGS. 1-3 can be directly or indirectly attached to the adjustable clamping element 102. The adjustable clamping element 102 and the rotatable mounting element 104 can be one integral part or component parts that are attached together by any attaching means that allows the rotatable mounting element 104 to rotate. The rotatable mounting element 104 includes a base plate 106 and a plurality of mounting arms 108 extending from the base plate 106. The base plate 106 and the plurality of mounting arms 108 can be one integral part or component parts that are attached together by any attaching means.

Referring to FIG. 3, the base plate 106 can be a cylindrically shaped disc or other element that is capable of being rotated 360 degrees clockwise or counter-clockwise. The base plate 106 provides a rotating platform from which mounting arms 108 extend. The mounting arms 108 are spaced a specified distance apart relative to one another on the base plate 106. The mounting arms 108 also extend from the base plate 106 at a specified angle relative to the base plate 106. The size of the mounting arms 108, the distance between the mounting arms 108 and the angle at which the mounting arms 108 extend from the base plate 106 establish and define mounting slots 110, 112 between pairs of mounting arms 108. The rotatable mounting element 104 can include any number of mounting arms 108 and any number of mounting slots 110, 112.

The mounting arms 108 can also include a gripping material on a surface of the mounting arms 108 to provide a better grip, a better viewing angle or better attachment to a mounting surface secured between the mounting arms 108. The gripping material can be applied to a portion of mounting arms 108 or the entirety of the mounting arms 108 can be made of the gripping material. The gripping material can be any material that increases the adhesion, grip or coefficient of friction between the gripping surface of mounting arms 108 and a mounting surface secured between the mounting arms 108. The gripping material can include, but is not limited to rubber, polymeric material or other plastic, metal, alloy, fabric, composite material or other material capable of increasing the adhesion, grip or coefficient of friction between the gripping surface of mounting arms 108 and a mounting surface secured between the mounting arms 108. The gripping material and gripping surface can be textured and composed of the same or different material.

In one exemplary embodiment, the rotatable mounting element 104 includes four mounting arms and four mounting slots. In another exemplary embodiment, the rotating mounting element 104 includes 6 mounting arms and six mounting slots.

The mounting arms 108 and mounting slots 110, 112, can engage a mounting surface (not shown) to mount the adjustable portable device holder 100. The adjustable portable device holder 100 is mounted to a mounting surface by positioning, press fitting or wedging a mounting surface within one or more mounting slots 110, 112 to engage two or more mounting arms 108. The adjustable portable device holder 100 can be mounted to various mounting surfaces including, but not limited to an automobile air conditioner vent blade, an automobile dashboard, an automobile sun visor, a credit card, the brim of a hat, a counter, a tripod, a bicycle, a backpack, a utensil, a ledge or other surface that can be positioned, press fit or wedged within one or more mounting slots 110, 112 between two or more mounting arms 108.

The rotatable mounting element 104 can include any number of mounting arms 108 forming and defining any number of mounting slots 110, 112. As may be appreciated in at least FIGS. 1-3, 7, 8, 10, 11, 15, 16, 18 and 19, the size and shape of the mounting slots 110, 112 formed between pairs of mounting arms 108 can be controlled by adjusting the size and shape of the paired mounting arms 108, the distance between the pair of mounting arms 108 and the angle at which the two mounting arms 108 extend from the base plate 106 and converge toward one another. As depicted, each mounting arm 108 and mounting slot 110, 112 tapers in a direction away from a bottom surface of the rotatable mounting element 104. The rotatable mounting element 104 can include one or more different size mounting slots 110, 112 to accommodate different size mounting surfaces. For instance in FIG. 3, one mounting slot 110 having clearance A can be larger than another mounting slot 112 having clearance B. One or more of the mounting slots 110 formed on the rotatable mounting element 104 can accommodate a larger mounting surface than other mounting slots 112 formed on the rotatable mounting element 104.

The rotatable mounting element 104 can be rotated to position the mounting arms 108 and mounting slots 110, 112 in a horizontal plane, vertical plane, diagonal plane, circular plane, concave plane, convex plane or any plane between vertical and horizontal planes relative to the force of gravity. The mounting arms 108 and mounting slots 110, 112 can be positioned to engage a mounting surface in any engagement plane within the 360 degree rotation of the mounting element 104. The rotatable mounting element 104 can be rotated to position a relatively larger mounting slot 110 with clearance A in a horizontal, vertical, diagonal, circular, concave or convex plane to engage a relatively larger mounting surface in a horizontal, vertical, diagonal, circular, concave or convex engagement plane. The rotatable mounting element 104 can also be rotated to position a relatively smaller mounting slot 112 with clearance B in a horizontal, vertical, diagonal, circular, concave or convex plane to engage a relatively smaller mounting surface in a horizontal, vertical, diagonal, circular, concave or convex engagement plane.

The rotatable mounting element is capable of being rotated 360 degrees clockwise or counter-clockwise to engage different size mounting surfaces in a horizontal plane, vertical plane, diagonal plane, circular plane, concave plane, convex plane or any plane between vertical and horizontal planes. A device attached to the adjustable portable device holder 100 via the adjustable clamping element 102 can also be rotated 360 degrees clockwise or counter-clockwise while it is attached to the adjustable portable device holder 100 by rotating the rotatable mounting element 104.

FIGS. 4A and 4B illustrate an adjustable portable device holder 200 attached to a device 214 and a mounting surface 216 according to one embodiment. The device 214 is a smart phone and the mounting surface 216 is an automobile air conditioner vent blade.

Other portable devices can also fit into the adjustable clamping element including, but not limited to a tablet, an e-reader, a powerbank, a speaker, a multimedia player, a flashlight or other light, a television or other display, a laser or radar detector, an air freshener, a fan, a beverage or other device. The adjustable portable device holder 200 can also be mounted to other mounting surfaces including, but not limited to an automobile dashboard, an automobile sun visor, a credit card, the brim of a hat, a counter, a tripod, a bicycle, a backpack, a utensil, a ledge or other surface.

The adjustable portable device holder 200 includes an adjustable clamping element 202 attached to a rotatable mounting element 204. The adjustable clamping element 202 can be expanded and retracted to attach different size smartphones to the adjustable portable device holder 200. A force can be applied to expand or bias the adjustable clamping element 202 into an activated state and the force can be released to retract the adjustable clamping element 202 into a deactivated state to clamp around the smartphone 214. An elastic retracting or biasing element (not shown), such as a compression or torsion spring can be incorporated into the adjustable clamping element 202 to facilitate the expansion and retraction of the adjustable clamping element 202 and to accommodate different size smartphones.

The adjustable clamping element 202 can also include a gripping material on a surface of the adjustable clamping element 202 to provide a better grip, a better viewing angle or better attachment to the smart phone 214 or other device secured within the adjustable clamping element 202. The gripping material can be applied to a portion of the adjustable clamping element 202 or the entire adjustable clamping element 202 can be made of the gripping material. The gripping material can be any material that increases the adhesion, grip or coefficient of friction between the gripping surface of the adjustable clamping element 202 and a surface of a device secured within the adjustable clamping element 202. The gripping material can include, but is not limited to rubber, polymeric material or other plastic, metal, alloy, fabric, composite material or other material capable of increasing the adhesion, grip or coefficient of friction between the gripping surface of the adjustable clamping element 202 and a surface of a device secured within the adjustable clamping element 202. The gripping material and gripping surface can be textured and composed of the same or different material.

The rotatable mounting element 204 can be directly or indirectly attached to the adjustable clamping element 202. The adjustable clamping element 202 and the rotatable mounting element 204 can be one integral part or component parts that are attached together by any attaching means, such as a screw, ratchet, pin, rod or friction or other device that allows the rotatable mounting element 204 to rotate. The rotatable mounting element 204 includes a base plate 206 and a plurality of mounting arms 208 extending from the base plate 206. The base plate 206 and the plurality of mounting arms 208 can be one integral part or component parts that are attached together by any attaching means.

The base plate 206 can be a cylindrically shaped disc or other element that is capable of being rotated 360 degrees clockwise or counter-clockwise. The base plate 206 provides a rotating platform from which the mounting arms 208 extend. The mounting arms 208 are spaced a specified distance apart relative to one another on the base plate 206. The mounting arms 208 also extend from the base plate 206 at a specified angle relative to the base plate 206. The size of the mounting arms 208, the distance between the mounting arms 208 and the angle at which the mounting arms 208 extend from the base plate 206 establish and define mounting slots 210, 212 between pairs of mounting arms 208. The rotatable mounting element 204 includes four mounting arms 208 and four mounting slots 210, 212.

The mounting arms 208 and mounting slots 210, 212, can engage and attach to an air conditioner vent blade 216 to mount the adjustable portable device holder 200. The adjustable portable device holder 200 is mounted to the air conditioner vent blade 216 by positioning, press fitting or wedging a surface of the air conditioner vent blade 216 within one or more mounting slots 210, 212 to engage two or more mounting arms 208.

The mounting arms 208 can also include a gripping material on a surface of the mounting arms 208 to provide a better grip, a better viewing angle or better attachment to the air conditioner vent blade 216 secured between mounting arms 208. The gripping material can be applied to a portion of mounting arms 208 or the entirety of the mounting arms 208 can be made of the gripping material. The gripping material can be any material that increases the adhesion, grip or coefficient of friction between the gripping surface of mounting arms 208 and an air conditioner vent blade 216 secured between the mounting arms 208. The gripping material can include, but is not limited to rubber, polymeric material or other plastic, metal, alloy, fabric, composite material or other material capable of increasing the adhesion, grip or coefficient of friction between the gripping surface of mounting arms 208 and the air conditioner vent blade 216 secured between the mounting arms 208. The gripping material can be and gripping surface and composed of the same or different material.

The rotatable mounting element 204 includes two different sizes of mounting slots 210, 212 to accommodate different size air conditioner vent blades 216 or other mounting surfaces. Two mounting slots 210 having clearance A are larger than the other two mounting slots 212 having clearance B.

The rotatable mounting element 204 can be rotated to position the mounting arms 208 and mounting slots 210, 212 in a horizontal, vertical, diagonal, circular, concave, convex or any plane between vertical and horizontal planes to engage air conditioner vent blades 216 oriented in a horizontal, vertical, diagonal, circular, concave, convex or any plane between vertical and horizontal planes. The mounting arms 208 and mounting slots 210, 212 can be positioned to attach to an air conditioner vent blade in any engagement plane within the 360 degree rotation of the mounting element 204. The rotatable mounting element 204 can be rotated to position the larger mounting slots 210 with clearance A in a horizontal, vertical, diagonal, circular, concave, convex or any plane between vertical and horizontal planes to engage or attach to larger air conditioner vent blades 216 oriented in a horizontal, vertical, diagonal, circular, concave, convex or any plane between vertical and horizontal planes. The rotatable mounting element 204 can also be rotated to position the smaller mounting slots 212 with clearance B in a horizontal, vertical, diagonal, circular, concave, convex or any plane between vertical and horizontal planes to engage or attach to smaller air conditioner vent blades 216 oriented in a horizontal, vertical, diagonal, circular, concave, convex or any plane between vertical and horizontal planes.

The rotatable mounting element 204 is capable of being rotated 360 degrees clockwise or counter-clockwise to engage different size mounting surfaces in a horizontal, vertical, diagonal, circular, concave, convex or any plane between vertical and horizontal planes relative to the force of gravity. The smart phone 214 attached to the adjustable portable device holder 200 can be rotated into a portrait orientation (shown in FIG. 4A) and a landscape orientation (shown in FIG. 4B) by rotating the rotatable mounting element 204. The smart phone 214 attached to the adjustable portable device holder 200 can be rotated 360 degrees clockwise or counter-clockwise while it is attached to the adjustable portable device holder 200 by rotating the smart phone 214 and adjustable clamping element 202, while the rotatable mounting element 204 is secured to a mounting surface.

Figure 5:
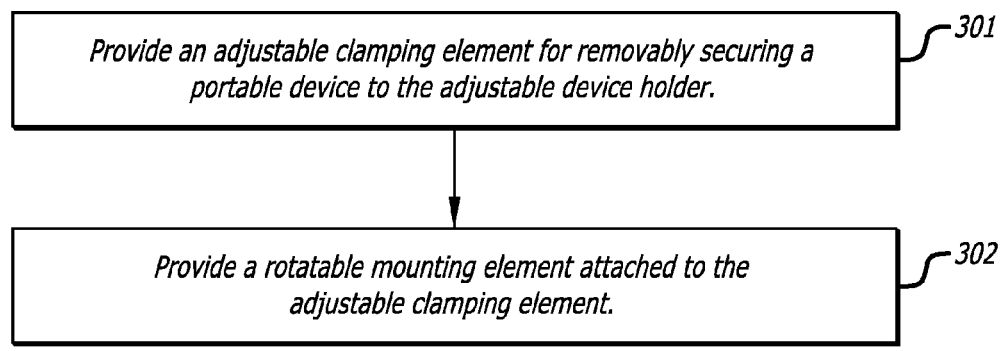
FIG. 5 illustrates a flow chart of a process for manufacturing an exemplary adjustable portable device holder according to one embodiment.
Figure 6:
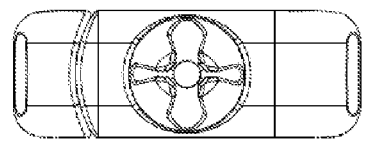
FIG. 6 is an elevation view of the back of an adjustable portable device holder in a retracted setting.
Figure 7:
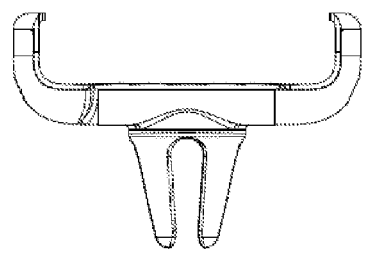
FIG. 7 is a plan view of the top of an adjustable portable device holder in a retracted setting.
Figure 8:
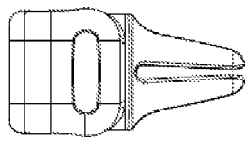
FIG. 8 is an elevation view of left side of an adjustable portable device holder in a retracted setting.
Figure 9:
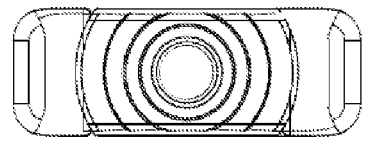
FIG. 9 is an elevation view of the front of an adjustable portable device holder in a retracted setting.
Figure 10:
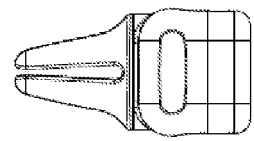
FIG. 10 is an elevation view of the right side of an adjustable portable device holder in a retracted setting.
Figure 11:
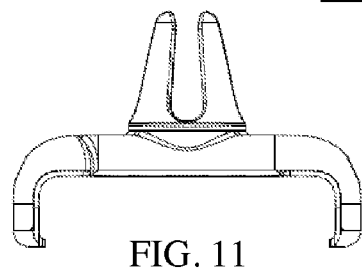
FIG. 11 is a plan view of the bottom of an adjustable portable device holder in a retracted setting.
Figure 12:
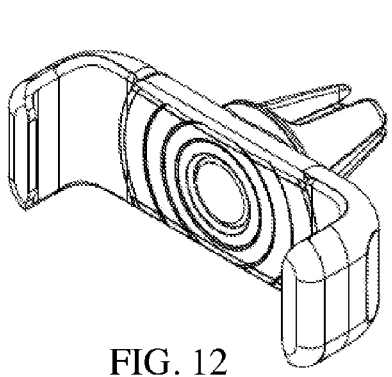
FIG. 12 is an isometric view, from the front right, of an adjustable portable device holder in a retracted setting.
Figure 13:
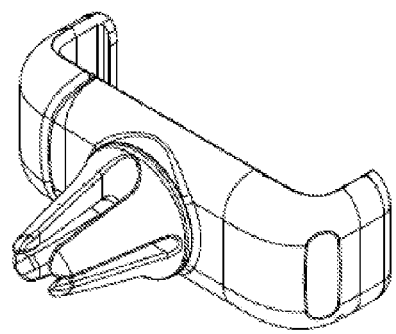
FIG. 13 is an isometric view, from the back left, of an adjustable portable device holder in a retracted setting.
Figure 14:
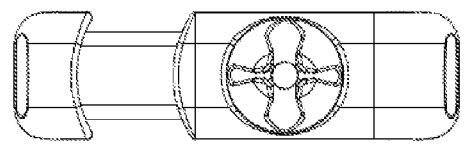
FIG. 14 is an elevation view of the back of an adjustable portable device holder in an expanded setting.
Figure 15:
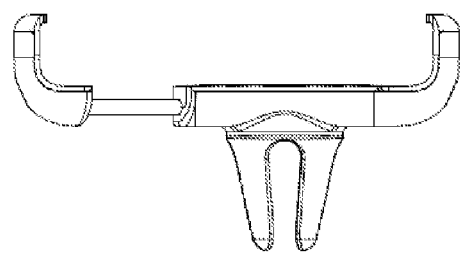
FIG. 15 is a plan view of the top of an adjustable portable device holder in an expanded setting.
Figure 16:
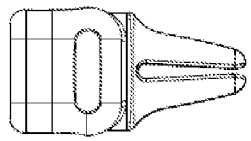
FIG. 16 is an elevation view of left side of an adjustable portable device holder in an expanded setting.
Figure 17:
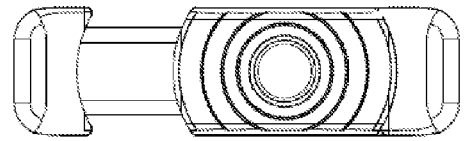
FIG. 17 is an elevation view of the front of an adjustable portable device holder in an expanded setting.
Figure 18:
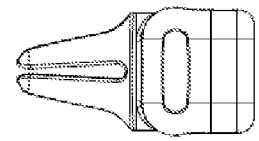
FIG. 18 is an elevation view of the right side of an adjustable portable device holder in an expanded setting.
Figure 19:
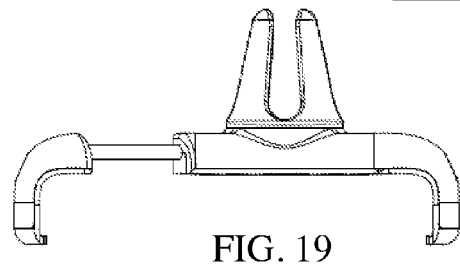
FIG. 19 is a plan view of the bottom of an adjustable portable device holder in an expanded setting.
Figure 20:
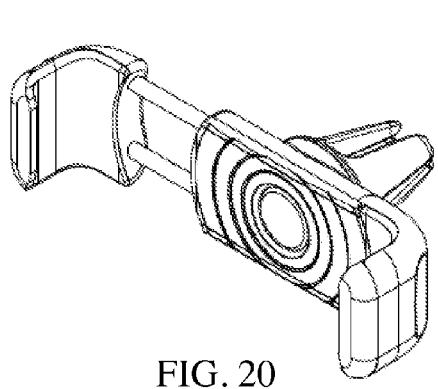
FIG. 20 is an isometric view, from the front right, of an adjustable portable device holder in an expanded setting.
Figure 21:
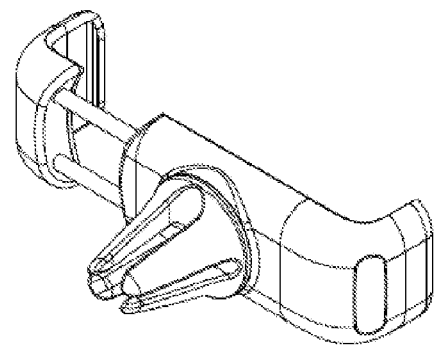
FIG. 21 is an isometric view, from the back left, of an adjustable portable device holder in an expanded setting.

FIG. 5 illustrates a flow chart of a process for manufacturing an exemplary adjustable portable device holder according to one embodiment. At step 301, the process includes providing an adjustable clamping element for removably securing a portable device to the adjustable portable device holder. The adjustable clamping element is capable of being biased into an activated state and unbiased into a deactivated state to secure one of a plurality of different size portable device to the adjustable portable device holder.

As an example and as depicted in FIGS. 2, 14, 15, 16 and 19-21, to manufacture the adjustable portable device holder, two stainless steel rods can be inserted into an expandable arm cavity of a double injection mold. PC/ABS is injected into the cavities of the mold to hold the rods in place and to produce an expandable arm, main body and cover of an adjustable clamping element. The mold is then rotated and injected with TPE to form side grips of the expandable arm and body of the adjustable clamping element. A stainless steel spring is inserted over each rod and held in place by a stainless steel screw affixed to the end of the rods. Grease is added to the lower portion of the spring and rods (near the screw head). The expandable arm is inserted into the body and the springs are lowered and held in place within the body of the adjustable clamping element. The cover is then slid on to the body to hold the adjustable arm in place.

The adjustable clamping element or a surface thereof can also be formed from rubber, polymeric material or other plastic, metal, alloy, or composite material that is rigid, semi-rigid or textured.

At step 302, a rotatable mounting element is provided, which can be attached to the adjustable clamping element via screw, ratchet, pin, rod or friction or other attachment means. The rotatable mounting element includes a plurality of mounting arms each spaced a specified distance apart from one another and extending at a specified angle from a bottom surface of the rotatable mounting element. Each pair of the plurality of mounting arms form a mounting slot therein between. The rotatable mounting element is capable of being rotated to position a first mounting slot in a vertical, horizontal or diagonal orientation and a second mounting slot in a vertical, horizontal or diagonal orientation to engage a first mounting surface in a vertical, horizontal or diagonal orientation or a second mounting surface in a vertical, horizontal or diagonal orientation.

For example, a rotatable mounting element can be formed in whole or part from stainless metal or other metal, alloy or plastic sheet stamped to form a clip or base plate with four arms extending from the base plate, spaced a specified distance apart and bent to a desired angle. If metal or other heat treatable material, the rotatable mounting element can be heat treated to form a rigid structure. The rotatable mounting element or a surface thereof can also be formed from rubber, polymeric material or other plastic, metal, alloy, or composite material that is rigid, semi-rigid or textured.

A zinc-alloy nut or other alloy or material can be formed using a die-cast mold to attach the rotatable mounting element to the adjustable clamping element. Glue is added to the cavity of the nut. The rotatable mounting element is affixed to the main body of the adjustable clamping element via the nut and a second stainless screw. A force gage is used to monitor the rotational force of the rotatable mounting element and the rotatable mounting element is adjusted if screw is too tight or loose.

TPE is injected into a mold to create a skirt and four socks. The skirt and four socks can also be formed from rubber, polymeric material or other plastic, metal, alloy, or composite material that is rigid, semi-rigid or textured. The skirt is assembled over the mounting arms of the rotatable mounting element. Glue is added to each mounting arm of the rotatable mounting element. A sock is inserted over each mounting arm, which holds the skirt in place.

Example embodiments have been described hereinabove regarding adjustable portable device holder systems and methods. Various modifications to and departures from the disclosed example embodiments will occur to those having ordinary skill in the art. The subject matter that is intended to be within the spirit of this disclosure is set forth in the following claims.

What is claimed is:

1. An adjustable portable device holder comprising:
   an adjustable clamping element, wherein the adjustable clamping element is capable of being biased into an activated state and unbiased into a deactivated state to removably secure one of a plurality of different size portable devices to the adjustable portable device holder;
   the adjustable clamping element comprising two side grips opposingly oriented to one another and each side grip has a device engaging surface that abuttingly engages a portable device in the activated state of the adjustable clamping element, wherein the two side grips linearly translate relative to one another upon transition between the activated and deactivated states of the adjustable clamping element;
   the adjustable clamping element further comprising two rods, an expandable arm, a main body, and springs inserted one each over each rod and held in place by a screw affixed to an end of the respective rod; and
   a rotatable mounting element attached to the adjustable clamping element by a rotary connection that permits 360 degree clockwise and counter-clockwise rotation of the adjustable clamping element relative to the rotatable mounting element, the rotatable mounting element comprising a pair of mounting arms spaced a distance apart from one another and converging toward one another, each extending at an angle away from a bottom surface of the rotatable mounting element and thereby forming a mounting slot between the pair of mounting arms, wherein the rotary connection positions the mounting slot in various orientations relative to the adjustable clamping element across an entirety of the 360 degrees of rotation.

2. The adjustable portable device holder as recited in claim 1, wherein a width of the mounting slot tapers away from the bottom surface of the rotatable mounting element and wherein the rotary connection is capable of releasably setting the mounting slot in two 180 degree spaced apart vertical orientations and two 180 degree spaced apart horizontal orientations for alternative engagement with vertically and horizontally oriented mounting surfaces.

3. The adjustable portable device holder as recited in claim 2, wherein the mounting surface is an air conditioner vent blade in an automobile.

4. The adjustable portable device holder as recited in claim 1, wherein each mounting arm tapers away from the bottom surface of the rotatable mounting element.

5. The adjustable portable device holder as recited in claim 1, wherein the mounting arms comprise a gripping surface formed from gripping material.

6. The adjustable portable device holder as recited in claim 5, wherein the gripping material is at least one material selected from the group consisting of: rubber, polymeric material, plastic, metal, alloy and composite material.

7. The adjustable portable device holder as recited in claim 5, wherein the gripping surface is textured.

8. The adjustable portable device holder as recited in claim 1, wherein the springs are loadable by an applied expansive force to bias the adjustable clamping element into the activated state.

9. The adjustable portable device holder as recited in claim 1, wherein the adjustable clamping element comprises a gripping surface formed from gripping material.

10. The adjustable portable device holder as recited in claim 1, wherein the device is a smartphone.

11. The adjustable portable device holder as recited in claim 1, wherein the rotatable mounting element is attached with a screw to the adjustable clamping element.

12. The adjustable portable device holder as recited in claim 1, wherein the rotatable mounting element is attached with a ratchet device to the adjustable clamping element.

13. The adjustable portable device holder as recited in claim 1, wherein the rotatable mounting element is attached with a pin to the adjustable clamping element.

14. The adjustable portable device holder as recited in claim 1, wherein the rotatable mounting element is friction fit to the adjustable clamping element.

* * * * *